US012591802B2

(12) United States Patent (10) Patent No.: US 12,591,802 B2

Liao et al. (45) Date of Patent: Mar. 31, 2026

---

(54) GENERATING ESTIMATES BY COMBINING UNSUPERVISED AND SUPERVISED MACHINE LEARNING

(71) Applicant: Intuit Inc., Mountain View, CA (US)

(72) Inventors: Jingxian Liao, San Jose, CA (US); Wei Wang, San Jose, CA (US); Zhicheng Xue, Union City, CA (US)

(73) Assignee: Intuit Inc., Mountain View, CA (US)

( * ) Notice: Subject to any disclaimer, the term of this patent is extended or adjusted under 35 U.S.C. 154(b) by 1182 days.

(21) Appl. No.: 17/491,240

(22) Filed: Sep. 30, 2021

(65) Prior Publication Data

US 2023/0101182 A1 Mar. 30, 2023

(51) Int. Cl.
*G06N 20/00* (2019.01)
*G06F 18/214* (2023.01)
*G06F 18/2413* (2023.01)

(52) U.S. Cl.
CPC ......... *G06N 20/00* (2019.01); *G06F 18/2148* (2023.01); *G06F 18/24137* (2023.01)

(58) Field of Classification Search
CPC ................ G06N 20/00; G06F 18/2148; G06F 18/24137
See application file for complete search history.

(56) References Cited

U.S. PATENT DOCUMENTS

| | | | | |
|---|---|---|---|---|
| 10,565,471 B1 * | 2/2020 | Abdi Taghi Abad | .... | G06N 7/01 |
| 2017/0228615 A1 * | 8/2017 | Chavez | ............. | G06F 18/23213 |

| | | | | |
|---|---|---|---|---|
| 2019/0354850 A1 * | 11/2019 | Watson | .................... | G06N 5/02 |
| 2021/0049428 A1 * | 2/2021 | Huang | ................... | G06V 10/70 |
| 2022/0092214 A1 * | 3/2022 | Brannon | ............... | G06F 21/577 |
| 2022/0108137 A1 * | 4/2022 | Margolin | ................. | G06N 5/04 |

FOREIGN PATENT DOCUMENTS

| | | | | | |
|---|---|---|---|---|---|
| CN | 102254028 A | * | 11/2011 | | |
| CN | 108369659 A | * | 8/2018 | ............. | G06N 20/10 |
| CN | 111079830 A | * | 4/2020 | ........... | G06F 18/217 |
| WO | WO-2021034932 A1 | * | 2/2021 | ............. | G06N 3/045 |

OTHER PUBLICATIONS

Jason Brownlee, "K-Nearest Neighbors for Machine Learning", published on Aug. 15, 2020 to https://machinelearningmastery.com/k-nearest-neighbors-for-machine-learning, retrieved Mar. 26, 2025. (Year: 2020).*

(Continued)

*Primary Examiner* — Shourjo Dasgupta

(74) *Attorney, Agent, or Firm* — Lathrop GPM LLP

(57) ABSTRACT

A method may include obtaining a cluster. The cluster may include a subset of reference entities. The method may further include calculating distances between features of a target entity and features of the subset of reference entities, selecting, based on the distances, peer entities from the subset, and generating an estimated value of a metric. The generating may include applying, to the features of the target entity, a machine learning model trained using training data including values of the features for the peer entities labeled with a value of the metric. The method may further include presenting the estimated value of the metric.

20 Claims, 5 Drawing Sheets

(56) References Cited

OTHER PUBLICATIONS

Hauwen Liu, etc., "A New Feature Selection Method based on Clustering", published via 2011 Eighth International Conference on Fuzzy Systems and Knowledge Discovery (FSKD) (vol. 2, 2011, pp. 965-969), retrieved Mar. 26, 2025. (Year: 2011).*

Johnnie C-N Chang, etc., "Clustering System Data using Aggregate Measures", published via SysML18, Feb. 2018, Stanford, CA USA, 2018., retrieved on Mar. 26, 2025 to https://mlsys.org/Conferences/doc/2018/201.pdf. (Year: 2018).*

Antony Christopher, "K-Nearest Neighbor", published Feb. 2, 2021 to https://medium.com/swlh/k-nearest-neighbor-ca2593d7a3c4, retrieved Mar. 26, 2025. (Year: 2021).*

Aristides Gionis, etc., "Clustering Aggregation", published via ACM Transactions on Knowledge Discovery from Data, vol. 1, No. 1, Article 4, Publication date: Mar. 2007, retrieved Mar. 26, 2025. (Year: 2007).*

Hands on Machine Learning, "Chapter 21 Hierarchical Clustering", published on Jul. 28, 2019 to https://bradleyboehmke.github.io/HOML/hierarchical.html, retrieved Mar. 26, 2025. (Year: 2019).*

Ben Postance, "A guide to clustering large datasets with mixed data-types [updated]", published on Mar. 25, 2021 to https://bpostance.github.io/posts/clustering-mixed-data, retrieved Mar. 26, 2025. (Year: 2021).*

Edwin M. Knorr, etc., "Finding Aggregate Proximity Relationships and Commonalities in Spatial Data Mining", published via IEEE Transactions on Knowledge and Data Engineering, vol. 8, No. 6, Dec. 1996, retrieved Mar. 26, 2025. (Year: 1996).*

AJ Maschinot, "Extending Contrastive Learning to the Supervised Setting", published on Jun. 4, 2021 to https://research.google/blog/extending-contrastive-learning-to-the-supervised-setting, retrieved Sep. 26, 2025. (Year: 2021).*

Conglong Li, etc., "Improving Approximate Nearest Neighbor Search through Learned Adaptive Early Termination", published via SIGMOD '20: Proceedings of the 2020 ACM SIGMOD International Conference on Management of Data, Jun. 2020, retrieved Jan. 24, 2026. (Year: 2020).*

Yibang Ruan, etc., "A nearest-neighbor search model for distance metric learning", published via Information Sciences 552 (2021), pp. 261-277, retrieved Jan. 24, 2026. (Year: 2021).*

Dezhong Yao, etc., "Sparse Online Relative Similarity Learning", published on Apr. 15, 2021 to arXiv, retrieved Jan. 24, 2026. (Year: 2021).*

"1.6 Nearest Neighbors", retrieved via the wayback machine as of Aug. 12, 2021 for https://scikit-learn.org/stable/modules/neighbors.html, retrieved Jan. 24, 2026. (Year: 2021).*

Marius Muja, etc., "Scalable Nearest Neighbor Algorithms for High Dimensional Data", published via IEEE Transactions on Pattern Analysis and Machine Intelligence, vol. 36, No. 11, (Nov. 2014), retrieved Jan. 24, 2026. (Year: 2014).*

Purushottam Kar, etc., "Similarity-based Learning via Data Driven Embeddings", published on Dec. 22, 2011 to arXiv, retrieved Jan. 24, 2026. (Year: 2011).*

Alexandr Andoni, etc., "Approximate Nearest Neighbor Search in High Dimensions", published on Jun. 26, 2018 to arXiv, retrieved Jan. 24, 2026. (Year: 2018).*

* cited by examiner

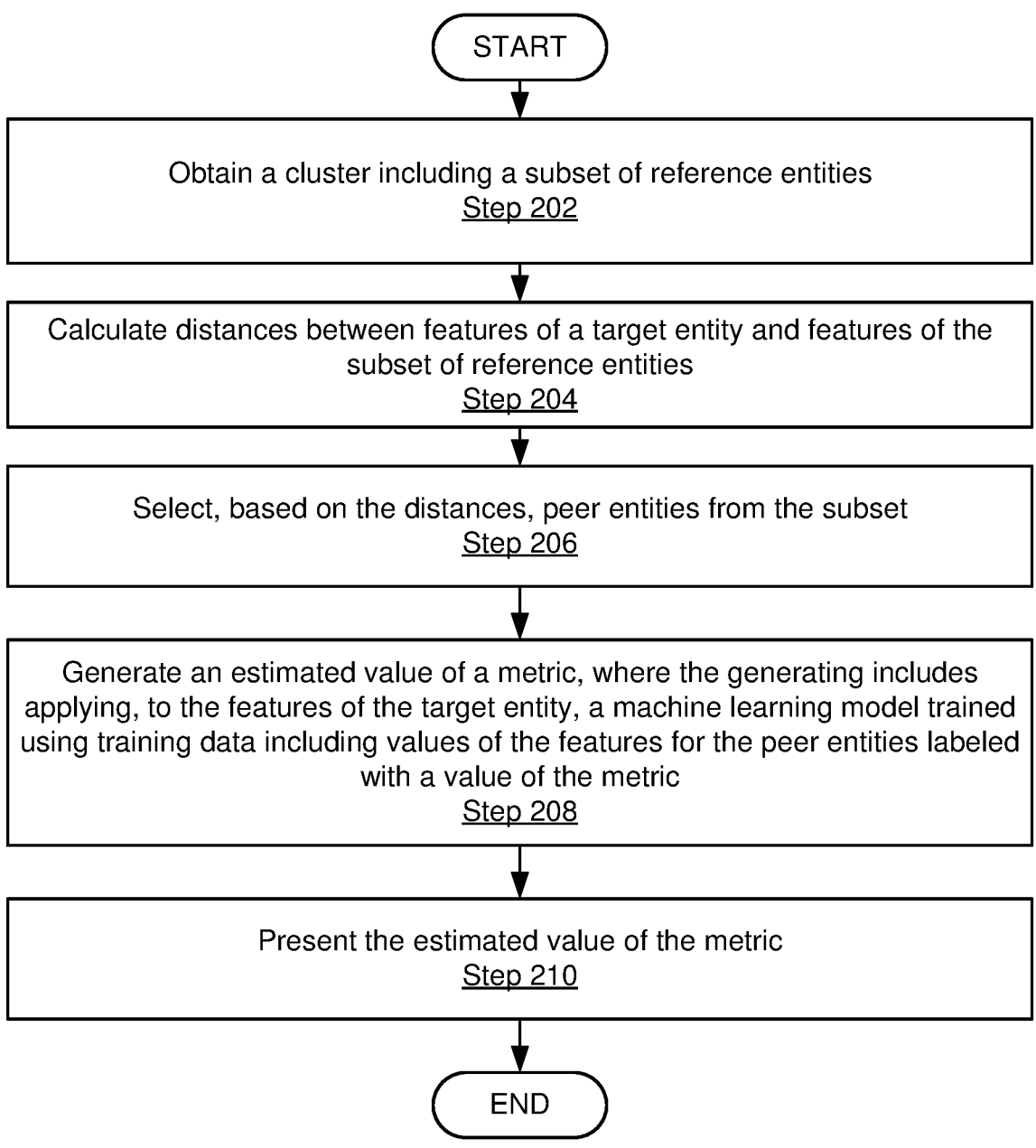

START

Obtain a cluster including a subset of reference entities
Step 202

Calculate distances between features of a target entity and features of the
subset of reference entities
Step 204

Select, based on the distances, peer entities from the subset
Step 206

Generate an estimated value of a metric, where the generating includes
applying, to the features of the target entity, a machine learning model trained
using training data including values of the features for the peer entities labeled
with a value of the metric
Step 208

Present the estimated value of the metric
Step 210

END

FIG. 2

START

Send a target entity request to a metric estimation manager configured to transmit an estimated value of a metric by performing the steps of FIG. 2
Step 254

Receive, from the metric estimation manager, the estimated value of the metric
Step 256

Present the estimated value of the metric
Step 258

END

500
Computing
System

508
Output Device(s)

504
Non-Persistent
Storage

502
Computer
Processor(s)

506
Persistent
Storage

512
Communication
Interface

510
Input Device(s)

520
Network

522
Node X

524
Node Y

526
Client Device

GENERATING ESTIMATES BY COMBINING UNSUPERVISED AND SUPERVISED MACHINE LEARNING

BACKGROUND

Estimating the value of a metric for an entity may be useful in a variety of scenarios. For example, estimating the revenue of a business entity may be useful in determining whether to approve a request for a loan. Other examples may include: estimating the performance (e.g., response time, resource consumption, cost, reliability) of a computational entity or mechanical entity. However, information about the entity relevant to the metric may be noisy and/or incomplete, thus making it difficult to generate an accurate estimate.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including obtaining a cluster. The cluster includes a subset of reference entities. The method further includes calculating distances between features of a target entity and features of the subset of reference entities, selecting, based on the distances, peer entities from the subset, and generating an estimated value of a metric. The generating includes applying, to the features of the target entity, a machine learning model trained using training data including values of the features for the peer entities labeled with a value of the metric. The method further includes presenting the estimated value of the metric.

In general, in one aspect, one or more embodiments relate to a system including a computer processor, a repository configured to store clusters including a cluster including a subset of reference entities, and metric estimation manager executing on the computer processor and configured to: calculate distances between features of a target entity and features of the subset, select, based on the distances, peer entities from the subset, and generate an estimated value of a metric. The generating includes applying, to the features of the target entity, a machine learning model trained using training data including values of the features for the peer entities labeled with a value of the metric. The metric estimation manager is further configured to present the estimated value of the metric. generating an estimated value of a metric.

In general, in one aspect, one or more embodiments relate to a method including sending a target entity request to a metric estimation manager configured to perform obtaining a cluster. The cluster includes a subset of reference entities. The metric estimation manager is further configured to perform: calculating distances between features of a target entity and features of the subset of reference entities, selecting, based on the distances, peer entities from the subset, and generating an estimated value of a metric. The generating includes applying, to the features of the target entity, a machine learning model trained using training data including values of the features for the peer entities labeled with a value of the metric. The metric estimation manager is further configured to perform transmitting the estimated value of the metric. presenting the estimated value of the metric. The method further includes receiving, from the metric estimation manager, the estimated value of the metric, and presenting the estimated value of the metric.

Other aspects of the invention will be apparent from the following description and the appended claims.

BRIEF DESCRIPTION OF DRAWINGS

FIG. 2 and FIG. 3 show flowcharts in accordance with one or more embodiments of the invention.

DETAILED DESCRIPTION

Figure 1:
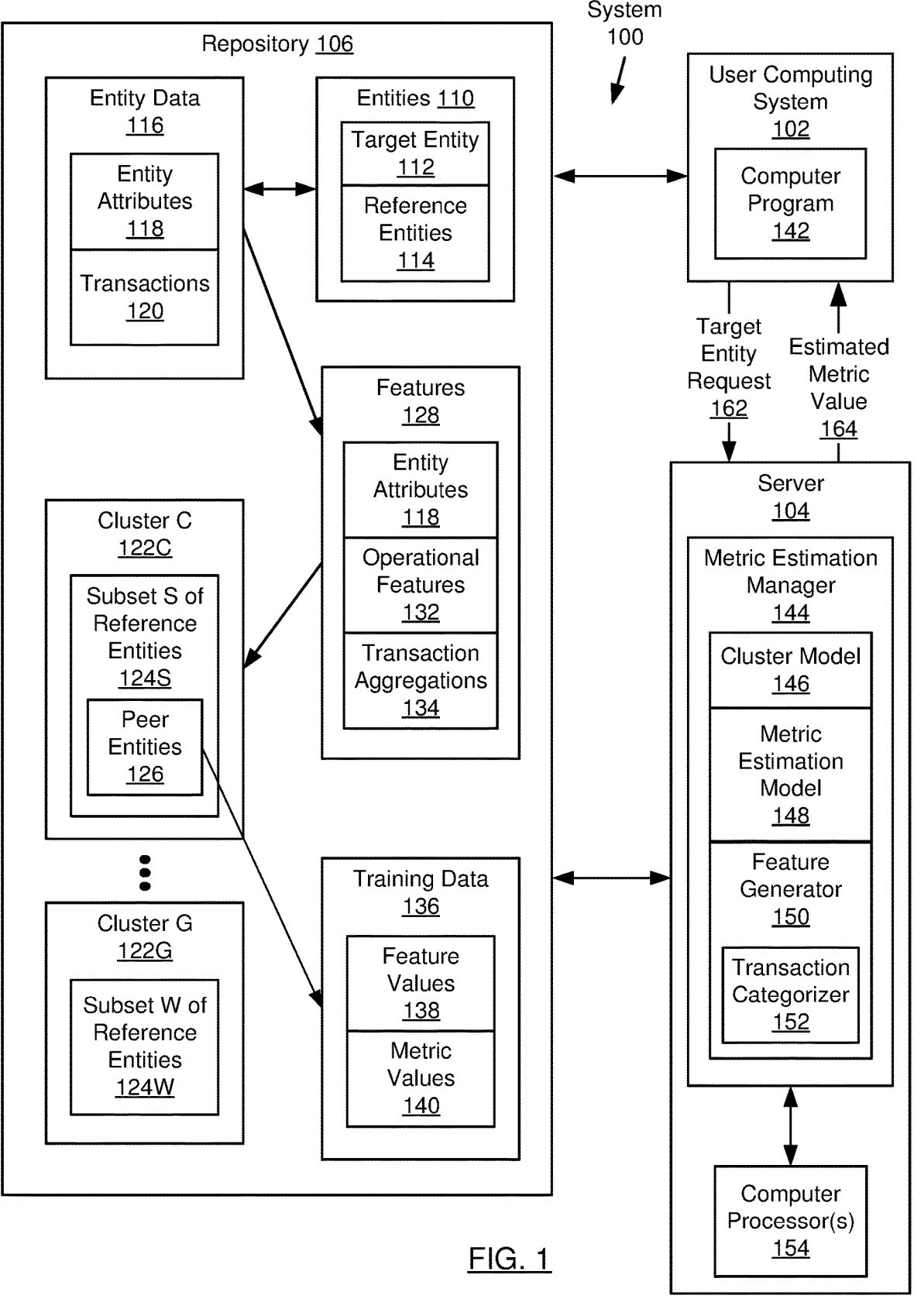
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a machine learning architecture for computer system estimation of a metric value for an entity, referred to as the target entity. For example, the target entity may be a company and the metric may be revenue. The metric may be estimated in response to a request from the target entity. For example, the request may be a loan application.

By way of a more detailed overview, clusters may be obtained that include subsets of reference entities. The clusters may be based on features of the entities. Examples of features may include: entity attributes (e.g., location, industry code), operational features and/or transaction aggregations. Operational features are characteristics of the entity that relate to actions performed by the entity (e.g., loans received, cost of goods sold). Transaction aggregations are aggregations (e.g., sums, averages, etc.) of different categories of the transactions of the entity (e.g., total taxes, total expenses). One of the clusters may be the closest cluster to the target entity, based on the distances (e.g., Canberra distances) calculated between the features of the target entity and the centroids of the clusters.

Peer entities that are similar to the target entity may be selected from the cluster closest to the target entity by calculating distances between the features of the subset of reference entities and the features of the target entity. A metric estimation machine learning model may be trained using the features of the peer entities labeled with a value of the metric. The metric estimation machine learning model may be applied to the features of the target entity to estimate a value of the metric for the target entity.

By estimating (e.g., predicting) the value of the metric for the target entity with a machine learning model trained using information about peer entities of the target entity, an accurate value of the metric may be generated despite a lack of information about the target entity. In contrast, manual generation of an estimated value of a metric is typically error-prone and inaccurate.

FIG. 1 shows a diagram of a system (100) in accordance with one or more embodiments. As shown in FIG. 1A, the system (100) includes multiple components such as the user computing system (102), a server (104), and a repository (106). Each of these components is described below.

In one or more embodiments, the user computing system (102) provides, to a user, a variety of computing functionality. For example, the computing functionality may include word processing, multimedia processing, financial management, business management, social network connectivity, network management, and/or various other functions that a computing device performs for a user.

The user computing system (102) may be a mobile device (e.g., phone, tablet, digital assistant, laptop, etc.) or any other computing device (e.g., desktop, terminal, workstation, etc.) with a computer processor (not shown) and memory (not shown) capable of running computer software. The user computing system (102) may take the form of the computing system (500) shown in FIG. 5A connected to a network (520) as shown in FIG. 5B.

The user computing system (102) includes a computer program (142). The computer program (142), in accordance with one or more embodiments, is a software application written in any programming language that includes executable instructions stored in some sort of memory. The instructions, when executed by one or more processors, enable a device to perform the functions described in accordance with one or more embodiments. The computer program (142) may include a graphical user interface (GUI) for receiving input from a user and transmitting output to the user. The GUI may be rendered and displayed within a local desktop software application or the GUI may be generated by a remote web server and transmitted to a user's web browser executing locally on a desktop or mobile device.

The repository (106) is any type of storage unit and/or device (e.g., a file system, database, collection of tables, or any other storage mechanism) for storing data. Further, the repository (106) may include multiple different storage units and/or devices. The multiple different storage units and/or devices may or may not be of the same type or located at the same physical site. The repository (106) may be accessed online via a cloud service (e.g., Amazon Web Services, Egnyte, Azure, etc.).

The repository (106) includes functionality to store entities (110), entity data (116), clusters (122C, 122G), features (128), and training data (136). An entity may be a person or business. Alternatively, an entity may be a computing or mechanical system. An entity may correspond to an entity identifier (e.g., a unique identifier). The entities (110) include a target entity (112) and reference entities (114). The target entity (112) is an entity that corresponds to a target entity request (e.g., target entity request (162)). For example, the target entity (112) may be a person or business that submits a request for a loan or other product or service. The reference entities (114) may be any entities for which entity data (116) is available.

Entities (110) correspond to entity data (116). The entity data (116) includes entity attributes (118) and transactions (120). The entity attributes (118) are general characteristics of the entity. For example, the entity attributes (118) may include categorical attributes such as: location (e.g., state or province), industry code (e.g., a standard industrial classification (SIC) code), etc. Alternatively or additionally, the entity attributes (118) may include numerical attributes such as: age, size (e.g., number of employees, if the entity is a business entity), etc.

The transactions (120) are records of events involving the entity and a payee. The payee may be a vendor or other entity that provides a product and/or service to the entity in exchange for receiving an amount (e.g., a dollar amount) on a date. The transactions (120) may be categorized into various categories. For example, financial transactions may be categorized into categories used in a chart of accounts (CoA), standard industrial classification (SIC) codes, tax form codes (e.g., sales, taxes, utility and/or other expenses, income), etc. The transactions (120) may be downloaded by the computer program (142) (e.g., from a financial institution used by the entity).

The features (128) include entity attributes (118), operational features (132), and/or transaction aggregations (134). The operational features (132) may be characteristics of the entity that relate to actions performed by the entity. Examples of operational features (132) for a business entity may include financial features such as: sales revenue, net deposits, loan disbursements, cost of goods sold, etc. The transaction aggregations (134) may be aggregations (e.g., sums, averages, etc.) of different categories of the transactions (120) of the entity. Examples of categories of transactions for a business entity may include total sales, total expenses, etc.

The operational features (132) and transaction aggregations (134) may vary across different time intervals. For example, operational features (132) and transaction aggregations (134) may be derived from transactions (120) occurring within a specific time interval.

The reference entities (114) may be divided into clusters (122C, 122G). The clusters (122C, 122G) include subsets of the reference entities (124S, 124W). The entities within a cluster are similar to one another with respect to a distance calculated from one or more features (e.g., feature vectors) of the entities. For example, the entities within a cluster may each be within a threshold distance of a center point (e.g., a centroid) of the cluster. Continuing this example, the distance may be a Canberra distance.

One of the clusters (e.g., cluster C (122C)) may be the closest cluster to the target entity (112), based on the distances calculated between the features of the target entity (112) and the centroids of the clusters (122C, 122G). Cluster C (122C) includes subset S of the reference entities (124S). The subset S of the reference entities (124S) in cluster C (122C) includes peer entities (126) that are entities in subset S that are similar to the target entity (112). For example, the peer entities (126) may be the entities closest to the target entity (112) with respect to the distance calculated from one or more features of the entities.

The server (104) includes a metric estimation manager (144) and computer processor(s) (154). The metric estimation manager (144) includes functionality to receive a target entity request (162) from the computer program (142). For example, the target entity request (162) may be a request for a loan or other product or service. The metric estimation manager (144) includes functionality to send an estimated metric value (164) to the computer program (142) in response to receiving the target entity request (162). The metric may be a measure of the performance of the target entity (112). For example, if the target entity (112) is a business entity, the metric may be revenue, expenses, etc.

The metric estimation manager (144) includes a cluster model (146), a metric estimation model (148), and a feature generator (150). The feature generator (150) includes functionality to generate the features (128) from the entity data (116). The feature generator (150) includes a transaction categorizer (152).

The transaction categorizer (152) includes functionality to generate the transaction aggregations (134) from the transactions (120). The transaction categorizer (152) may include functionality to generate the transaction aggregations (134) by matching transactions to regular expressions and/or rules. For example, a regular expression may describe a pattern associated with a transaction category.

The transaction categorizer (152) may be implemented as a machine learning model. For example, the transaction categorizer (152) may learn the classifications of transactions as categories based on a supervised ground-truth training data set. Continuing this example, each record in the training data set may include a transaction labeled with a category. The transaction categorizer (152) may be implemented as a support vector machine (SVM) classifier. Alternatively, the transaction categorizer (152) may be implemented as various types of deep learning models based on neural networks (e.g., based on convolutional neural networks (CNNs)), random forests, logistic regression with different regularization methods (e.g., lasso, ridge, elastic net), gradient boosting (e.g., XGBoost), bagging, adaptive boosting (AdaBoost), etc.).

The cluster model (146) may be an unsupervised machine learning model. The cluster model (146) includes functionality to divide the entities (110) into clusters (122C, 122G). In one or more embodiments, the cluster model (146) divides the entities (110) into clusters (122C, 122G) using one or more entity attributes (118). For example, the cluster model (146) may divide business entities into clusters using the entity attributes "industry code" and/or "geographic location." Alternatively, in one or more embodiments, the cluster model (146) divides the entities (110) into clusters (122C, 122G) using aggregated features. The aggregated features may be aggregations of the entity attributes (118), operational features (132), and/or transaction aggregations (134). For example, the cluster model (146) may use feature reduction to generate representative lower-dimensional, aggregated features from the entity attributes (118), operational features (132), and/or transaction aggregations (134). Continuing this example, the cluster model (146) may use Uniform Manifold Approximation and Projection (UMAP) to generate the aggregated features. UMAP is a machine learning technique used for dimension reduction or feature selection (e.g., rather than generation of aggregated features). Further continuing this example, the cluster model (146) may use K-means clustering to group the entities (110) into clusters (122C, 122G).

The metric estimation model (148) includes functionality to generate an estimated value of a metric. For example, for business entities, the metric may be total revenue, total sales, total expenses, etc. The metric estimation model (148) may be implemented as a machine learning model. For example, the metric estimation model (148) may be implemented as a tree-based model such as XGBoost and LightGBM. Because the underlying data may be incomplete in a practical problem solving situation, tree-based models may handle such missing data during training by either ignoring missing values during a split, and later allocating the values to the branch with the largest loss reduction (e.g., missing values are handled by default). In contrast, other algorithms may require missing values prior to model training, causing additional complexity to be introduced into the machine learning pipeline (e.g., without significant life in model performance).

Alternatively, the metric estimation model (148) may be implemented using one of the aforementioned types of deep learning models based on neural networks. The metric estimation model (148) may be trained using training data (136) that includes feature values (138) of peer entities (126) labeled with metric values (140). That is, the metric estimation model (148) learns the relationship between the values of features of peer entities (126) to values of the metric.

In one or more embodiments, the computer processor(s) (154) takes the form of the computer processor(s) (502) described with respect to FIG. 5A and the accompanying description below. In one or more embodiments, the computer processor (154) includes functionality to execute the metric estimation manager (144).

While FIG. 1 shows a configuration of components, other configurations may be used without departing from the scope of the invention. For example, various components may be combined to create a single component. As another example, the functionality performed by a single component may be performed by two or more components.

FIG. 2 shows a flowchart in accordance with one or more embodiments of the invention. The flowchart depicts a process for estimating a value of a metric for an entity. One or more of the steps in FIG. 2 may be performed by the components (e.g., the metric estimation manager (144) and computer program (142) of the system (100)) discussed above in reference to FIG. 1. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, a cluster including a subset of reference entities is obtained. The cluster may be one of multiple clusters obtained in response to a target entity request (e.g., a request for a product or service) submitted by a target entity. The feature generator may generate features for the target entity and the reference entities. The features include entity attributes, operational features, and/or transaction aggregations. Examples of entity attributes for a business entity include location, industry code, etc. Examples of operational features for a business entity include financial features such as: sales revenue, net deposits, etc. Examples of transaction aggregations for a business entity include sums or averages of different categories of transactions (e.g., total sales, total expenses) of the business entity. The cluster may be selected as the closest cluster to the target entity, based on the distances calculated between the features of the target entity and the centroids of the clusters.

The features may be generated for a specific time interval. For example, the feature generator may generate operational features and transaction aggregations by executing queries on transactions of the respective entity occurring within a specific time interval.

The transaction categorizer may generate transaction aggregations that are relevant to the metric. For example, transaction aggregations for the transaction categories "accounts receivable," "income," "sales," may be relevant to the metric of "revenue." In contrast, transaction aggregations for the transaction categories "loan funding" and "transactions between accounts" may be irrelevant to the metric of "revenue."

The cluster model may divide the reference entities into different clusters based on the features of the entities. In one or more embodiments, the cluster model divides the reference entities into different clusters based on a subset of the entity attributes. Alternatively, in one or more embodiments, the cluster model aggregates the entity attributes, the operational features and/or the transaction aggregations to obtain aggregated features. The cluster model may then divide the reference entities into clusters using the aggregated features.

In Step 204, distances between features of the target entity and features of the subset of reference entities are calculated. For example, the distances may be calculated as Canberra distances between feature vectors that represent the features of the respective entities.

In Step 206, peer entities are selected from the subset using the distances. The peer entities may be selected as the entities in the subset with the smallest calculated distances to the target entity. For example, the peer entities may be the N entities in the subset with the smallest distances to the target entity, where N is a predetermined number of entities.

In Step 208, an estimated value of the metric is generated by applying a machine learning model to the features of the target entity. The machine learning model is trained using training data including values of the features for the peer entities labeled with a value of the metric. Thus, the peer entities may serve as a benchmark from which the performance of the target entity, relative to the metric, may be predicted. For example, the features and estimated values of the metric for the peer entities may be available, while the features of the target entity may be unavailable or inaccurate.

In Step 210, the estimated value of the metric is presented. The metric may be presented in a graphical user interface (GUI) (e.g., the GUI of the computer program). The metric estimation manager may recommend a response to the target entity request using the estimated value of the metric. For example, the metric estimation manager may recommend the approval or rejection of the target entity request based on the value of the metric. Continuing this example, the metric estimation manager may recommend the approval or rejection of the target entity request based on whether the value of the metric exceeds a threshold.

The process of FIG. 2 may be repeated for different time intervals. For example, features of the entities may be generated for the different time intervals. The features may have different values in the different time intervals because one or more of the features (e.g., operational features and transaction aggregations) may be generated from transactions occurring in the respective time interval. Thus, the reference entities may be divided into different clusters in the different time intervals, which in turn results in the selection of different peer entities in the different time intervals. Different estimated values of the metric may be generated by applying the machine learning model to the different features of the target entity in the different time intervals. For example, the different estimated values of the metric may be combined. Continuing this example, the different estimated values of the metric may be combined in an average or a weighted average. In addition, trend analysis may be performed to identify short-term, long-term and/or seasonal trends in the estimated values of the metric.

In one or more embodiments, the machine learning model is further trained using training data including values of the features for the different peer entities labeled with a value of the metric.

Figure 3:
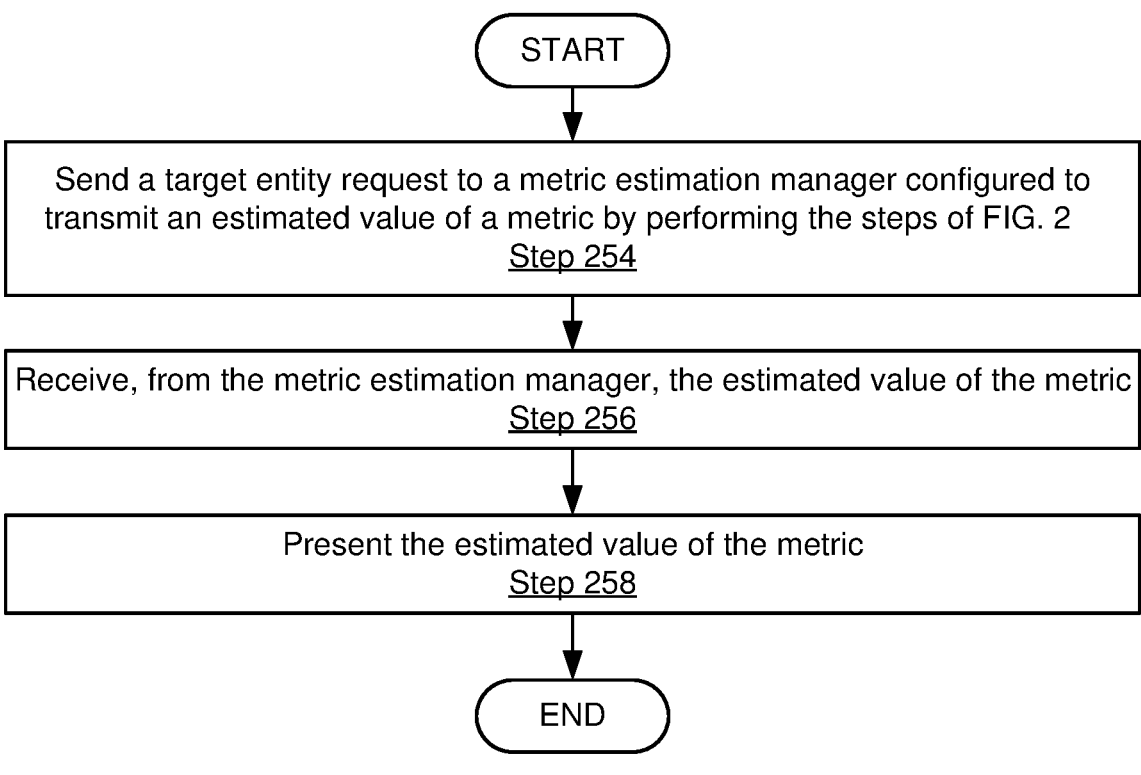

FIG. 3 shows a flowchart in accordance with one or more embodiments of the invention. The flowchart depicts a process for estimating a value of a metric for an entity. One or more of the steps in FIG. 3 may be performed by the components (e.g., the metric estimation manager (144) and computer program (142) of the system (100)) discussed above in reference to FIG. 1. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 254 a target entity request is sent to metric estimation manager configured to transmit an estimated value of a metric by performing the steps of FIG. 2. The computer program may send the target entity request to the metric estimation manager via a network.

In Step 256, the estimated value of the metric is received from the metric estimation manager. The computer program may receive the estimated value of the metric from the metric estimation manager via the network.

Initially, in Step 258, the estimated value of the metric is presented (see description of Step 210 above).

Figure 4:
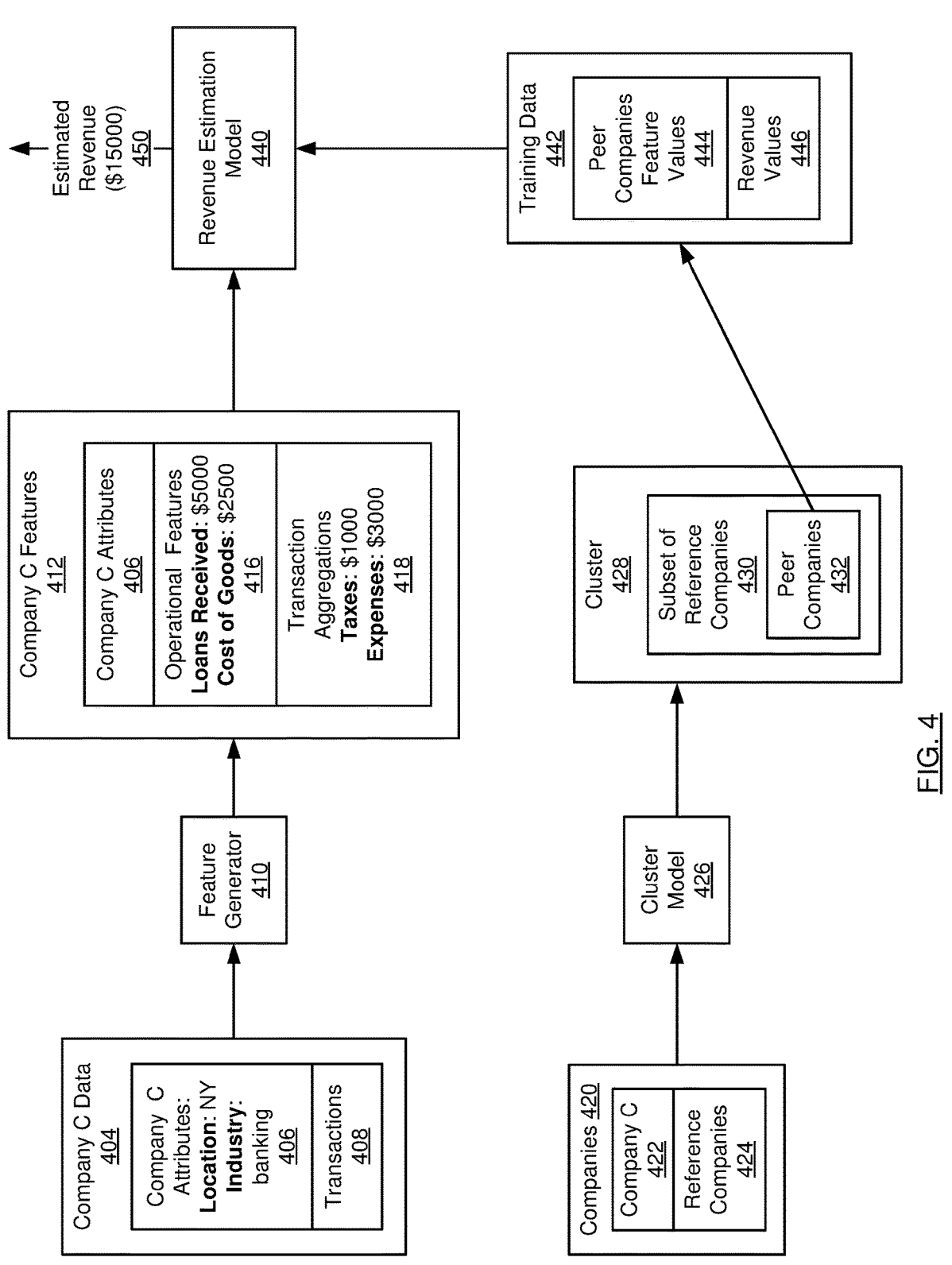
FIG. 4 shows an example in accordance with one or more embodiments of the invention.

FIG. 4 shows an implementation example in accordance with one or more embodiments. The implementation example is for explanatory purposes only and not intended to limit the scope of the invention. One skilled in the art will appreciate that implementation of embodiments of the invention may take various forms and still be within the scope of the invention.

FIG. 4 shows company C data (404) ((116) in FIG. 1) that includes company C attributes (406) ((118) in FIG. 1) and transactions (408) ((120) in FIG. 1). Company C data (404) is provided to the metric estimation manager along with a loan application. That is, in this example, the entities are companies, company C is the target company, the target company request is a loan application, and the metric is revenue (e.g., monthly revenue). The feature generator (410) ((150) in FIG. 1) of the metric estimation manager generates company C features (412) ((128) in FIG. 1) from the company C data (404). The company C features (412) include the company C attributes (406), as well as operational features (416) ((132) in FIG. 1) and transaction aggregations (418) ((134) in FIG. 1). The operational features (416) are financial features of company C. The transaction aggregations (418) correspond to categories used in a chart of accounts (CoA) of company C.

The cluster model (426) ((146) in FIG. 1) of the metric estimation manager divides reference companies (424) ((114) in FIG. 1) into clusters using the company attributes of the reference companies (424). The reference companies (424) and company C (422) ((112) in FIG. 1) are included in the set of all companies (420) ((110) in FIG. 1). Each cluster includes a subset of the reference companies (424). Cluster (428) is the cluster that is closest to company C (422), and includes a subset of the reference companies (430) ((124S) in FIG. 1). That is, cluster (428) includes banking companies in the vicinity of New York. The metric estimation manager selects peer companies (432) ((126) in FIG. 1) based on distances calculated between the features of company C (422) and the features of the subset of the reference companies (430). A revenue estimation model (440) ((148) in FIG. 1) of the metric estimation manager is then trained using training data (442) ((136) in FIG. 1). The training data (442) includes peer companies feature values (444) ((138) in FIG. 1) labeled with revenue values (446) ((140) in FIG. 1). Applying the trained revenue estimation model (440) to the company C features (412) results in an estimated revenue (450) ((164) in FIG. 1).

Embodiments disclosed herein may be implemented on a computing system specifically designed to achieve an improved technological result. When implemented in a computing system, the features and elements of this disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5A:
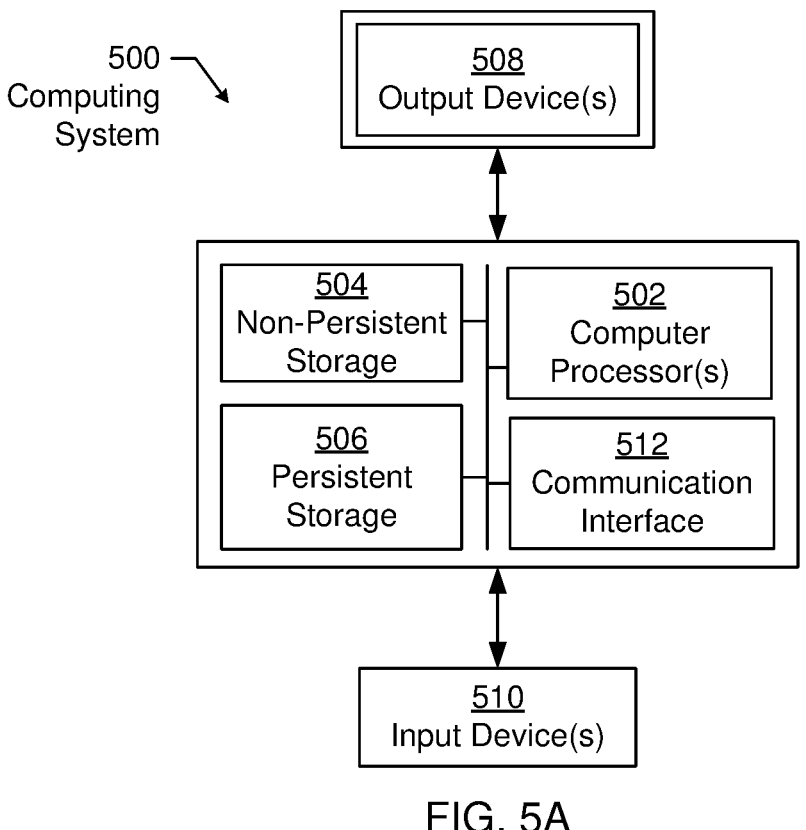
FIG. 5A and FIG. 5B show computing systems in accordance with one or more embodiments of the invention.
Figure 5B:
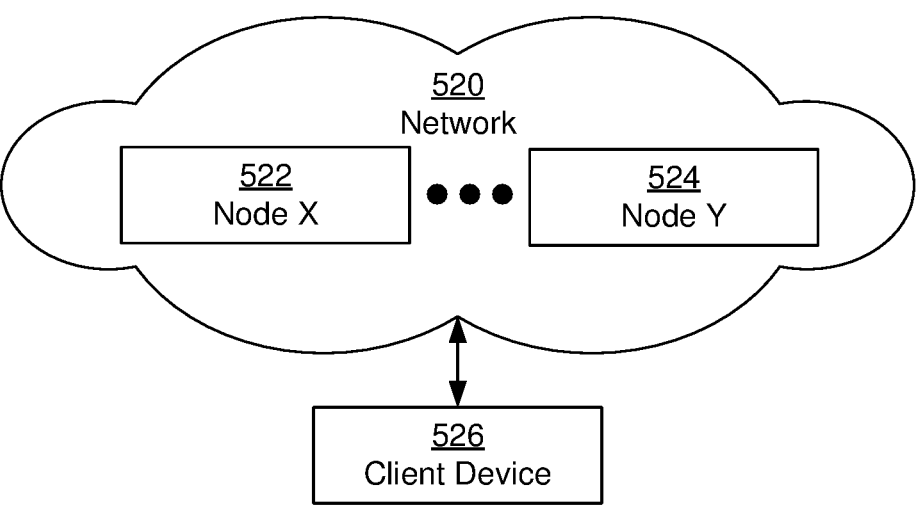

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
obtaining a first cluster of a first plurality of clusters, wherein the first cluster comprises a first subset of a plurality of reference entities;
calculating a first plurality of distances between a first plurality of features of a target entity and the first plurality of features of the first subset of the plurality of reference entities;
selecting, from the first subset, a first plurality of peer entities that are closest, within the first subset, to the target entity according to the first plurality of distances, each peer entity in the first plurality of peer entities being labeled with a corresponding value of a metric of the peer entity;
training, after selecting, a machine learning model specifically for the target entity, wherein the machine learning model is trained to estimate, as output, the corresponding value of the metric of the peer entity using, as input, values of the first plurality of features from only the first plurality of peer entities;
generating, by applying the machine learning model to the first plurality of features of the target entity, and after training the machine learning model specifically for the target entity, a first estimated value of the metric for the target entity; and
presenting the first estimated value of the metric.

2. The method of claim 1, wherein the first plurality of clusters comprises a plurality of centroids, and wherein the target entity and the plurality of reference entities are comprised by a plurality of entities, the method further comprising:
generating the first plurality of features for the plurality of entities;
dividing, using the first plurality of features, the plurality of reference entities into the first plurality of clusters;
calculating a second plurality of distances between the first plurality of features of the target entity and the plurality of centroids; and
selecting, using the second plurality of distances, the first cluster.

3. The method of claim 2, wherein the first plurality of features comprises a plurality of transaction aggregations and a plurality of operational features, the method further comprising:
aggregating the plurality of transaction aggregations and the plurality of operational features to obtain plurality of aggregated features,
wherein the dividing is based on the plurality of aggregated features.

4. The method of claim 3, wherein the plurality of entities is associated with a plurality of transactions, the method further comprising:
dividing the plurality of transactions into a plurality of categories;
selecting a subset of the plurality of categories that are relevant to the metric; and
generating the plurality of transaction aggregations by aggregating the plurality of transactions in the subset of the plurality of categories.

5. The method of claim 2, wherein the first plurality of features comprises a plurality of entity attributes, and wherein the dividing is based on a subset of the plurality of entity attributes.

6. The method of claim 2, wherein the first plurality of features is generated for a first time window, the method further comprising:

generating a second plurality of features for the plurality of entities for a second time window;

dividing, using the second plurality of features, the plurality of reference entities into a second plurality of clusters, wherein the second plurality of clusters comprises a second cluster comprising a second subset of the plurality of reference entities;

calculating a third plurality of distances between a second plurality of features of the target entity and the second plurality of features of the second subset;

selecting, from the second subset and using the third plurality of distances, a second plurality of peer entities;

generating, by applying the machine learning model to the second plurality of features of the target entity, a second estimated value of the metric; and combining the first estimated value and the second estimated value.

7. The method of claim 6, further comprising:

further training the machine learning model using second training data comprising a plurality of values of the second plurality of features for the second plurality of peer entities labeled with a value of the metric.

8. The method of claim 1, further comprising:

receiving a target entity request, wherein the first cluster is obtained in response to receiving the target entity request; and recommending a response to the target entity request using the first estimated value of the metric.

9. A system comprising:

a computer processor;

a repository configured to store:

a first plurality of clusters comprising a first cluster comprising a first subset of a plurality of reference entities; and a metric estimation manager executing on the computer processor and configured to:

calculate a first plurality of distances between a first plurality of features of a target entity and the first plurality of features of the first subset, select, from the first subset, a first plurality of peer entities that are closest, within the first subset, to the target entity according to the first plurality of distances, each peer entity in the first plurality of peer entities being labeled with a corresponding value of a metric of the peer entity, train, after selecting, a machine learning model specifically for the target entity, wherein the machine learning model is trained to estimate, as output, the corresponding value of the metric of the peer entity using, as input, values of the first plurality of features labeled from only the first plurality of peer entities, generate, by applying the machine learning model to the first plurality of features of the target entity, and after training the machine learning model specifically for the target entity, a first estimated value of the metric for the target entity, and present the first estimated value of the metric.

10. The system of claim 9, further comprising a feature generator executing on the computer processor, wherein the first plurality of clusters comprises a plurality of centroids, wherein the target entity and the plurality of reference entities are comprised by a plurality of entities, wherein the feature generator is configured to generate the first plurality of features for the plurality of entities, and wherein the metric estimation manager is further configured to:

divide, using the first plurality of features for the plurality of entities, the plurality of reference entities into the first plurality of clusters, calculate a second plurality of distances between the first plurality of features of the target entity and the plurality of centroids, and select, using the second plurality of distances, the first cluster.

11. The system of claim 10, wherein the first plurality of features comprises a plurality of transaction aggregations and a plurality of operational features, and wherein the feature generator is further configured to:

aggregate the plurality of transaction aggregations and the plurality of operational features to obtain a plurality of aggregated features, wherein the plurality of entities is divided into the first plurality of clusters based on the plurality of aggregated features.

12. The system of claim 11, further comprising a transaction categorizer executing on the computer processor, wherein the plurality of entities is associated with a plurality of transactions, wherein the transaction categorizer is configured to:

divide the plurality of transactions into a plurality of categories, and select a subset of the plurality of categories that are relevant to the metric, and wherein the metric estimation manager is further configured to generate the plurality of transaction aggregations by aggregating transactions in the subset of the categories.

13. The system of claim 10, wherein the first plurality of features comprises a plurality of entity attributes, and wherein the plurality of entities is divided into the first plurality of clusters based on a subset of the plurality of entity attributes.

14. The system of claim 10, wherein the first plurality of features is generated for a first time window, wherein the feature generator is further configured to generate a second plurality of features for the plurality of entities for a second time window, and wherein the metric estimation manager is further configured to:

divide, using the second plurality of features, the plurality of reference entities into a second plurality of clusters, wherein the second plurality of clusters comprises a second cluster comprising a second subset of the plurality of reference entities;

calculate a third plurality of distances between a second plurality of features of the target entity and the second plurality of features of the second subset;

select, from the second subset and using the third plurality of distances, a second plurality of peer entities;

generate, by applying the machine learning model to the second plurality of features of the target entity, a second estimated value of the metric; and combine the first estimated value and the second estimated value.

15. The system of claim 14, wherein the machine learning model is further trained using second training data comprising a plurality of values of the second plurality of features for the second plurality of peer entities labeled with a value of the metric.

16. The system of claim 9, wherein the metric estimation manager is further configured to:

receive a target entity request, wherein the first cluster is obtained in response to receiving the target entity request; and recommend a response to the target entity request using the first estimated value of the metric.

17. A method comprising:

sending a target entity request to a metric estimation manager configured to perform:

obtaining a first cluster of a first plurality of clusters, wherein the first cluster comprises a first subset of a plurality of reference entities, calculating a first plurality of distances between a first plurality of features of a target entity and the first plurality of features of the first subset of the plurality of reference entities, selecting, from the first subset, a first plurality of peer entities that are closest, within the first subset, to the target entity according to the first plurality of distances, each peer entity in the first plurality of peer entities being labeled with a corresponding value of a metric of the peer entity, training, after selecting, a machine learning model specifically for the target entity, wherein the machine learning model is trained to estimate, as output, the corresponding value of the metric of the peer entity using, as input, values of the first plurality of features from only the first plurality of peer entities;

generating, by applying the machine learning model to the first plurality of features of the target entity, and after training the machine learning model specifically for the target entity, a first estimated value of the metric for the target entity, and transmitting the first estimated value of the metric;

receiving, from the metric estimation manager, the first estimated value of the metric; and presenting the first estimated value of the metric.

18. The method of claim 17, wherein the first plurality of clusters comprises a plurality of centroids, wherein the target entity and the plurality of reference entities are comprised by a plurality of entities, and wherein the metric estimation manager is further configured to perform:

generating a first plurality of transaction aggregations and a first plurality of operational features for the plurality of entities;

aggregating the first plurality of transaction aggregations and the first plurality of operational features to obtain a first plurality of aggregated features;

dividing, using the first plurality of aggregated features, the plurality of reference entities into the first plurality of clusters;

calculating a second plurality of distances between the first plurality of features of the target entity and the plurality of centroids; and selecting, using the second plurality of distances, the first cluster.

19. The method of claim 18, wherein the first plurality of aggregated features is generated for a first time window, and wherein the metric estimation manager is further configured to perform:

generating a second plurality of transaction aggregations and a second plurality of operational features for the plurality of entities;

aggregating the second plurality of transaction aggregations and the second plurality of operational features to obtain a second plurality of aggregated features;

dividing, using the second plurality of aggregated features, the plurality of reference entities into a second plurality of clusters, wherein the second plurality of clusters comprises a second cluster comprising a second subset of the plurality of reference entities;

calculating a third plurality of distances between the second plurality of aggregated features of the target entity and the second plurality of aggregated features of the second subset;

selecting, from the second subset and using the third plurality of distances, a second plurality of peer entities;

generating, by applying the machine learning model to a second plurality of features of the target entity, a second estimated value of the metric; and combining the first estimated value and the second estimated value.

20. The method of claim 19, wherein the metric estimation manager is further configured to perform:

further training the machine learning model using second training data comprising values of the second plurality of features for the second plurality of peer entities labeled with a value of the metric.

* * * * *